United States Patent
Mizuno et al.

(10) Patent No.: US 9,889,638 B2
(45) Date of Patent: Feb. 13, 2018

(54) ELECTRICAL HEATING-JOINING DEVICE AND METHOD

(71) Applicants: ECO-A CO., LTD., Morioka-shi, Iwate (JP); OKAWA SANKI INDUSTRIAL CO., LTD., Tokyo (JP)

(72) Inventors: Yoshinobu Mizuno, Iwate (JP); Osamu Kuriyama, Iwate (JP)

(73) Assignees: ECO-A CO., LTD., Morioka-Shi (JP); OKAWA SANKI INDUSTRIAL CO., LTD., Tokyo (JP)

( * ) Notice: Subject to any disclaimer, the term of this patent is extended or adjusted under 35 U.S.C. 154(b) by 441 days.

(21) Appl. No.: 14/376,661

(22) PCT Filed: Feb. 15, 2013

(86) PCT No.: PCT/JP2013/053679
§ 371 (c)(1),
(2) Date: Aug. 5, 2014

(87) PCT Pub. No.: WO2013/122196
PCT Pub. Date: Aug. 22, 2013

(65) Prior Publication Data
US 2015/0047779 A1    Feb. 19, 2015

(30) Foreign Application Priority Data

Feb. 16, 2012 (JP) ................. 2012-032103

(51) Int. Cl.
*B32B 37/06* (2006.01)
*B29C 65/44* (2006.01)
(Continued)

(52) U.S. Cl.
CPC .............. *B32B 37/06* (2013.01); *B29C 65/18* (2013.01); *B29C 65/224* (2013.01); *B29C 65/30* (2013.01);
(Continued)

(58) Field of Classification Search
CPC ........ B32B 37/06; B32B 41/00; H05B 3/0004
See application file for complete search history.

(56) References Cited

U.S. PATENT DOCUMENTS

| | | | |
|---|---|---|---|
| 2007/0084552 A1* | 4/2007 | Watanabe | B29C 65/1635 156/272.8 |
| 2010/0043980 A1* | 2/2010 | Sleijpen | B26D 7/086 156/378 |
| 2012/0021340 A1* | 1/2012 | Chen | B32B 37/06 429/535 |

FOREIGN PATENT DOCUMENTS

| | | |
|---|---|---|
| JP | 50-132047 | 10/1975 |
| JP | 52-154874 | 12/1977 |

(Continued)

OTHER PUBLICATIONS

International Search Report, dated Mar. 12, 2013 (dated Mar. 12, 2013).
Japanese Office Action dated Sep. 29, 2015, 4 pages.

*Primary Examiner* — Daniel McNally
(74) *Attorney, Agent, or Firm* — Rankin, Hill & Clark LLP

(57) ABSTRACT

An electrical heating bonding device 1 bonds a member M1 to be bonded, which is made of a metal, and a member M2 to be bonded, which is made of a resin. The electrical heating bonding device 1 includes: an upper electrode 11 and a lower electrode 12 which sandwich the member M1 to be bonded, and are electrically conductive with the member M1 to be bonded; a pressurizing unit 20 which applies pressure to a bonding surface between the member M1 to be bonded and the member M2 to be bonded; a temperature sensor 30 which detects a temperature of the member M1 to be bonded; and a control unit 40 which controls the pressurizing unit 20 to apply the pressure to the bonding surface, after (Continued)

the temperature detected by the temperature sensor 30 reaches a predetermined set temperature Ts.

17 Claims, 7 Drawing Sheets

(51) Int. Cl.
*B29C 65/00* (2006.01)
*B32B 41/00* (2006.01)
*H05B 3/00* (2006.01)
*B29C 65/18* (2006.01)
*B29C 65/22* (2006.01)
*B29C 65/30* (2006.01)
*B29C 65/38* (2006.01)

(52) U.S. Cl.
CPC .......... *B29C 65/44* (2013.01); *B29C 66/1122* (2013.01); *B29C 66/1284* (2013.01); *B29C 66/12821* (2013.01); *B29C 66/43* (2013.01); *B29C 66/522* (2013.01); *B29C 66/526* (2013.01); *B29C 66/742* (2013.01); *B29C 66/8161* (2013.01); *B29C 66/8223* (2013.01); *B29C 66/8322* (2013.01); *B29C 66/9121* (2013.01); *B29C 66/91216* (2013.01); *B29C 66/91221* (2013.01); *B29C 66/91411* (2013.01); *B29C 66/9241* (2013.01); *B29C 66/9292* (2013.01); *B29C 66/961* (2013.01); *B32B 41/00* (2013.01); *H05B 3/0004* (2013.01); *B29C 65/38* (2013.01); *B29C 66/126* (2013.01); *B29C 66/71* (2013.01); *B29C 66/74283* (2013.01); *B29C 66/81811* (2013.01); *B32B 2250/02* (2013.01); *B32B 2309/02* (2013.01); *B32B 2309/12* (2013.01)

(56) References Cited

FOREIGN PATENT DOCUMENTS

| JP | 58-081121 | | 5/1983 |
| JP | 58081121 A | * | 5/1983 |
| JP | 63-199086 | | 8/1988 |
| JP | 2011-235570 | | 11/2011 |
| JP | 2012-006068 | | 1/2012 |
| JP | 2012006068 A | * | 1/2012 |

* cited by examiner

ELECTRICAL HEATING-JOINING DEVICE AND METHOD

TECHNICAL FIELD

The present invention relates to an electrical heating bonding device and method for bonding a member to be bonded, which is made of a metal, and a member to be bonded, which is made of a resin.

BACKGROUND ART

There is a need for weight reduction while maintaining high strength and high rigidity, in many fields such as automotive parts and electric devices. Accordingly, to use a resin as a portion of a member made of a metal, a metal member and a resin member are bonded to each other.

Heat welding is known as an example. In heat welding, a metal member is heated to the melting temperature of a resin or higher and, with the resin member being in contact with the surface of the metal member, the contact portion of the resin member is melted and bonded to the metal member.

Moreover, Patent Document 1 describes the following bonding: a bonding portion between a metal member and a resin member has a metal compound film and a molecular adhesive in order from the metal member side, and a portion in which the resin member is in contact with the molecular adhesive has a locally re-hardened portion formed by locally melting and then hardening the resin member.

CITATION LIST

Patent Literature

Patent Document 1: Japanese Patent Publication Laid-open No. 2011-235570

SUMMARY OF INVENTION

Technical Problem

However, heat welding has a problem in that, since the whole metal member is heated to the melting temperature of the resin or higher, radiant heat from the metal surface may deform a portion of the resin member other than the welded portion. Heat welding also has a problem in that the surface of the metal member may discolor due to oxidation or the like as the temperature increases.

The bonding method described in Patent Document 1 has a problem in that the materials of the metal member and the resin member are extremely limited.

In view of the above, the present invention has an object of providing an electrical heating bonding device and method that can bond a resin member to a metal member without deformation, where the materials of the metal member and the resin member are not limited.

Solution to Problem

An electrical heating bonding device according to the present invention is an electrical heating bonding device which bonds a first member to be bonded and a second member to be bonded, the first member to be bonded being made of a metal, and the second member to be bonded being made of a resin, the electrical heating bonding device including: a plurality of electrodes which sandwich the first member to be bonded, and are electrically conductive with the first member to be bonded; a pressurizing unit which applies pressure to a bonding surface between the first member to be bonded and the second member to be bonded; a temperature sensor which detects a temperature of the first member to be bonded; and a control unit which controls the pressurizing unit to apply the pressure to the bonding surface, after the temperature detected by the temperature sensor reaches a predetermined temperature.

The electrical heating bonding device according to the present invention does not apply the pressure to the bonding surface until the temperature of the first member to be bonded reaches the predetermined temperature, so that few portions of the second member to be bonded increase in temperature. Thus, the second member to be bonded hardly experiences deformation such as bending or compression.

It is preferable that the electrical heating bonding device according to the present invention includes a power supply which supplies a current to the electrodes, and the power supply is in operation in a case where the temperature detected by the temperature sensor is lower than or equal to the predetermined temperature, and is stopped in a case where the temperature detected by the temperature sensor exceeds the predetermined temperature.

In this case, the power supply which supplies the current to the electrodes is started or stopped with reference to the temperature detected by the temperature sensor and the predetermined temperature. This ensures that the temperature of the first member to be bonded is maintained at the predetermined temperature.

It is preferable that the electrical heating bonding device according to the present invention includes a pressure sensor which detects the pressure applied to the bonding surface, and the control unit controls the pressurizing unit to stop applying the pressure to the bonding surface, in a case where the pressure sensor exceeds predetermined pressure.

In this case, the melting amount of the portion of the second member to be bonded near the bonding surface can be limited. This ensures that the second member to be bonded is kept from excessive penetration.

It is preferable that, in the electrical heating bonding device according to the present invention, after controlling the pressurizing unit to apply the pressure to the bonding surface, the control unit controls the pressurizing unit to stop applying the pressure to the bonding surface in a case where a predetermined time has elapsed.

In this case, the melting amount of the portion of the second member to be bonded near the bonding surface can be limited. This ensures that the second member to be bonded is kept from excessive penetration.

It is preferable that, in the electrical heating bonding device according to the present invention, the predetermined temperature is higher than or equal to a softening temperature of the second member to be bonded, and lower than a melting temperature of the second member to be bonded.

In this case, heat is transferred from the first member to be bonded, which has reached the predetermined temperature, to the second member to be bonded via the bonding surface. The second member to be bonded accordingly increases to the softening temperature or higher, and softens. The second member to be bonded can thus be bonded to the first member to be bonded, with the pressure applied to the bonding surface. Since the second member to be bonded does not exceed the melting temperature, excessive deformation, penetration, and the like are suppressed. It is more preferable that the predetermined temperature is equal to the softening temperature of the second member to be bonded or higher than the softening temperature by about ten to several tens of degrees, and significantly lower than the melting temperature.

It is preferable that, in the electrical heating bonding device according to the present invention, the first member to be bonded and the second member to be bonded are bonded in an air atmosphere.

In this case, the device can be simplified because the bonding portion between the first member to be bonded and the second member to be bonded does not need to be in a vacuum atmosphere or an inert gas atmosphere. Since the bonding is performed at a temperature lower than the melting temperature of the second member to be bonded, no oxide film is formed on the bonding surface.

It is preferable that, in the electrical heating bonding device according to the present invention, the pressurizing unit includes an elastic body, and applies the pressure to the bonding surface using an elastic force of the elastic body.

In this case, applying sudden large pressure to the bonding surface is prevented. This ensures that the second member to be bonded is kept from excessive penetration.

An electrical heating bonding method according to the present invention is an electrical heating bonding method for bonding a first member to be bonded and a second member to be bonded, the first member to be bonded being made of a metal, and the second member to be bonded being made of a resin, the electrical heating bonding method including: sandwiching the first member to be bonded between a plurality of electrodes which are electrically conductive with the first member to be bonded, and energizing the plurality of electrodes; and applying pressure to a bonding surface between the first member to be bonded and the second member to be bonded, after a temperature of the first member to be bonded reaches a predetermined temperature.

The electrical heating bonding method according to the present invention does not apply the pressure to the bonding surface until the temperature of the first member to be bonded reaches the predetermined temperature, so that few portions of the second member to be bonded increase in temperature. Thus, the second member to be bonded hardly experiences deformation such as bending or compression.

DESCRIPTION OF EMBODIMENTS

First Embodiment

The following describes an electrical heating bonding device 1 which is a first embodiment of the present invention.

Figure 1:
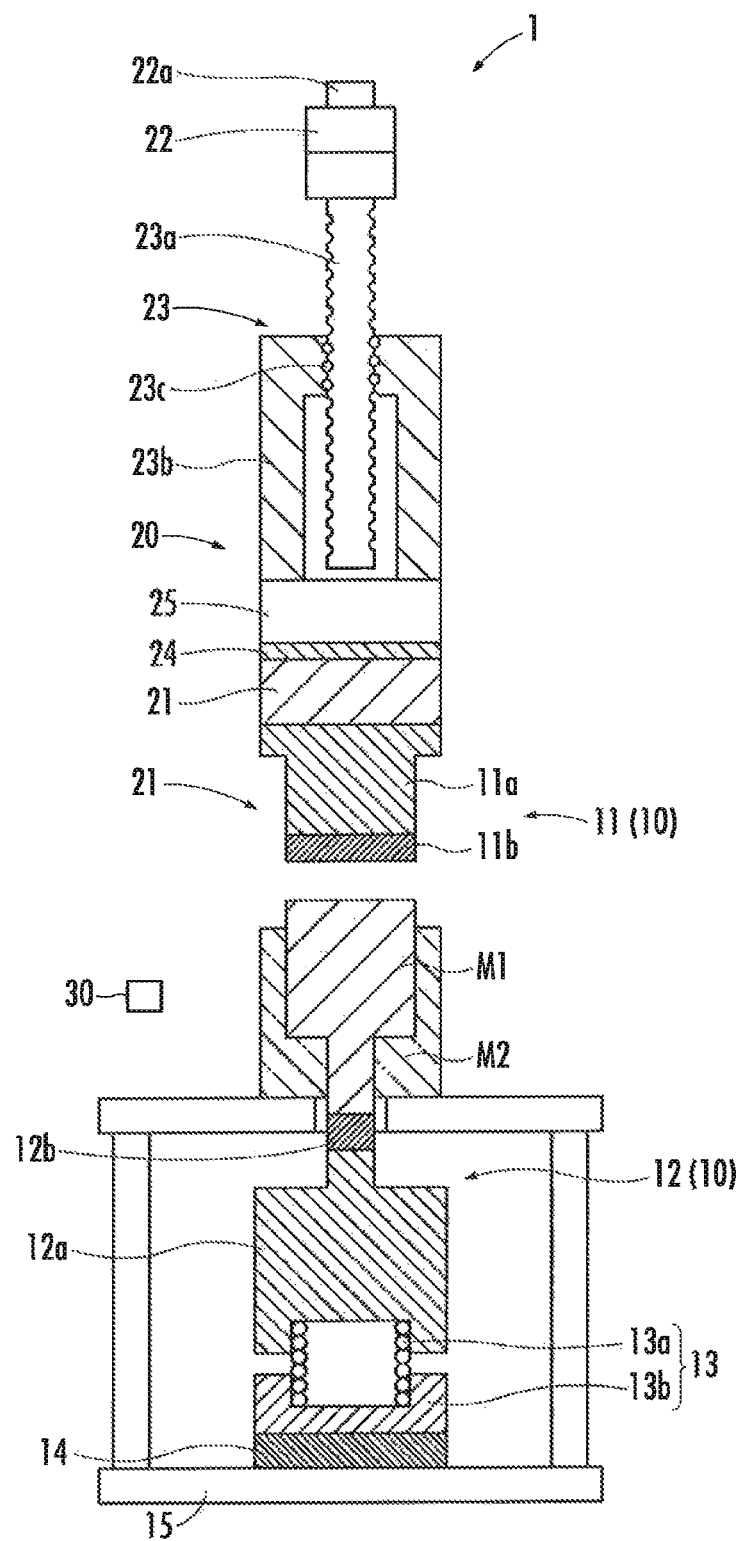
FIG. 1 is a schematic sectional view of an electrical heating bonding device according to a first embodiment of the present invention.
Figure 2:
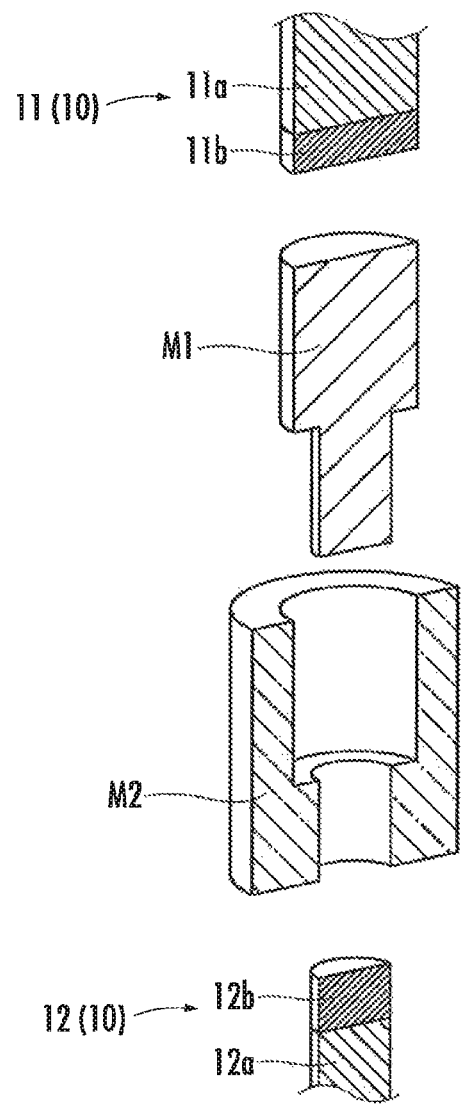
FIG. 2 is an enlarged cutaway perspective view of upper and lower electrodes, a pressing block, and members to be bonded.
Figure 3:
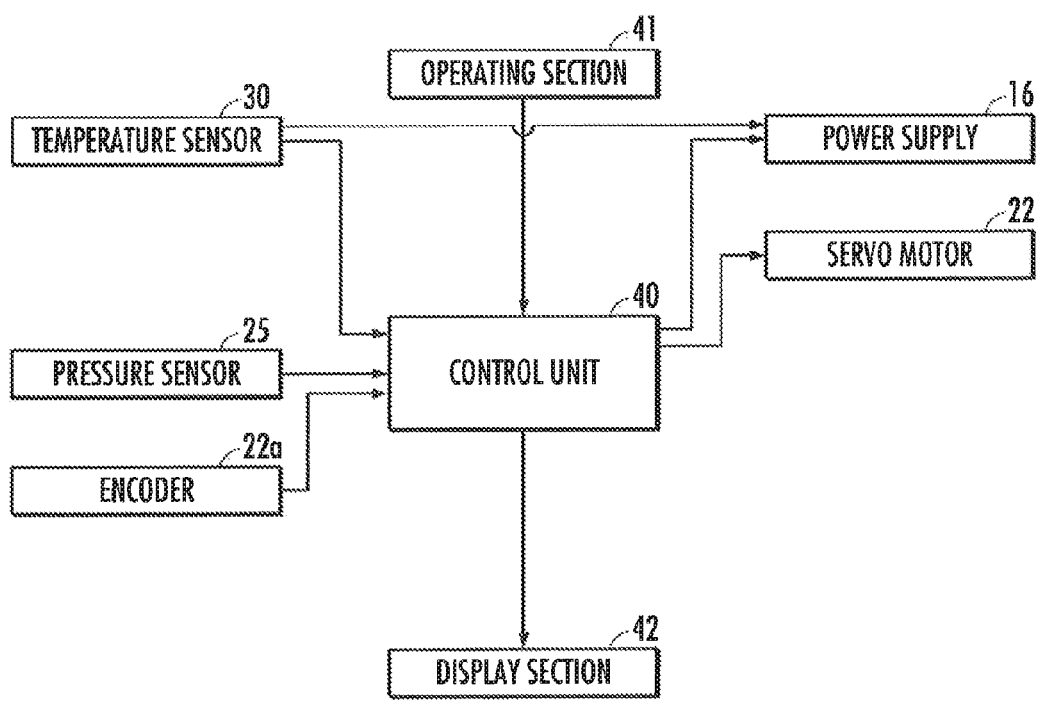
FIG. 3 is a block diagram of the electrical heating bonding device.

With reference to FIGS. 1 to 3, the electrical heating bonding device 1 is a device which bonds a member M1 to be bonded, which is made of a metal, and a member M2 to be bonded, which is made of a resin. The electrical heating bonding device 1 includes an electrode unit 10, a pressurizing unit 20, a temperature sensor 30, and a control unit 40. These components are mounted on a chassis (not shown).

The member M1 to be bonded is not limited to any particular material, so long as it is a metal capable of electrical conduction. Examples of the material of the member M1 to be bonded are metal materials including steel materials such as stainless steel, single-element non-ferrous metals such as copper, aluminum, and zinc, and various alloys including aluminum, nickel, chromium, titanium, copper, and the like.

The member M2 to be bonded is not limited to any particular material, so long as it is a resin. Examples of the material of the member M2 to be bonded are various natural resins and synthetic resins including polyphenylene sulfide (PPS) and polyamide (PA).

The member M1 to be bonded in this embodiment is shaped like a stepped cylinder. The member M2 to be bonded in this embodiment is shaped like a cylinder the inside of which is stepped. When the member M1 to be bonded is inserted into the member M2 to be bonded, the steps of the members M1 and M2 to be bonded abut against each other, and the outer peripheral surface of the member M1 to be bonded and the inner peripheral surface of the member M2 to be bonded come into contact with each other. The upper and lower ends of the member M1 to be bonded both protrude from the member M2 to be bonded. The bonding surfaces of the members M1 and M2 to be bonded are preferably rough surfaces, though they may instead be mirror surfaces.

The electrode unit 10 includes: a pair of an upper electrode 11 and a lower electrode 12; and a push-up mechanism 13 which pushes up the lower electrode 12. The push-up mechanism 13 in this embodiment includes: a spring 13a; and a block body 13b for regulating the spring 13a to have a predetermined length shorter than its free length between the block body 13b and the lower electrode 12. The pressure acting on the member M1 to be bonded from the lower electrode 12 pushed up by the push-up mechanism 13 is different depending on the material and shape of the member M2 to be bonded. For example, the pressure is 5 N to 100 N. The pressure can be changed by replacing the spring 13a.

The upper electrode 11 in this embodiment includes: an upper conductive electrode 11a made of copper, molybdenum, tungsten, or the like; and a resistive element 11b fixed to the bottom of the upper conductive electrode 11a.

The lower electrode 12 in this embodiment includes: a lower conductive electrode 12a made of copper, molybdenum, tungsten, or the like; and a resistive element 12b fixed to the top of the lower conductive electrode 12a. The bottom of the lower conductive electrode 12a is fixed to a foundation base 15 via an insulator 14 made of Bakelite or the like.

A gap of, for example, 1 mm or greater is provided between the member M1 to be bonded and each of the upper conductive electrode 11a and the lower conductive electrode 12a, to prevent a discharge between these components.

The resistive elements 11b and 12b are made of a material which generates heat upon electrical conduction, such as carbon, a carbon composite, silicon carbide, or stainless steel. The resistive element 11b comes into contact with the upper surface of the member M1 to be bonded, but does not come into contact with the member M2 to be bonded. The resistive element 11b in this embodiment is shaped like a circular plate. The resistive element 12b comes into contact with the lower surface of the member M1 to be bonded, but does not come into contact with the member M2 to be bonded. The resistive element 12b in this embodiment is shaped like a circular plate.

The upper electrode 11 and the lower electrode 12 are positioned so that their axes are collinear, and the member M1 to be bonded is sandwiched between the upper electrode 11 and the lower electrode 12. The upper conductive electrode 11a and the lower conductive electrode 12a are connected to a power supply 16 via cables (not shown), to be able to be energized. By energizing the upper conductive electrode 11a and the lower conductive electrode 12a in a state where the member M1 to be bonded is sandwiched between the resistive elements 11b and 12b, the whole member M1 to be bonded can be heated uniformly.

The power supply 16 in this embodiment is an inverter-controlled pulse power supply. The power supply 16 is provided with an inverter including rectifier circuits, diodes, and thyristors, and the pulse characteristic adjustment factors, such as the pulse waveform, the pulse width, the pulse interval, the current, and the voltage, of a generated pulse can be changed by the control unit 40.

The pressurizing unit 20 includes: a pressurizing block 21 to which the upper conductive electrode 11a is fixed; a drive source 22 for driving the pressurizing block 21; and a ball screw mechanism 23 which transmits the driving force of the drive source 22 to move the pressurizing block 21 up and down.

The pressurizing block 21 is made of copper, molybdenum, tungsten, or the like, and includes a fixing mechanism (not shown) for fixing the upper conductive electrode 11a. The pressurizing block 21 in this embodiment is shaped like a square plate to be versatile, though the pressurizing block 21 may instead be shaped like a circular plate in accordance with the upper surface of the upper conductive electrode 11a.

The upper conductive electrode 11a and the pressurizing block 21 can be cooled with a cooling fluid, such as pure water or tap water, which is circulated by a cooling mechanism (not shown). The lower conductive electrode 12a can also be cooled with the cooling fluid, such as pure water or tap water, which is circulated by the cooling mechanism (not shown).

The drive source 22 in this embodiment is a servo motor with a reduction gear. The servo motor 22 is provided with an encoder 22a, and placed on a chassis (not shown).

The ball screw mechanism 23 includes: a threaded shaft 23a extending in the vertical direction and having a thread groove formed on the outer peripheral surface; a nut 23b having a thread groove formed on the inner peripheral surface; and a plurality of balls 23c placed between these thread grooves. The nut 23b is fixed to the top of the pressurizing block 21, via an insulator 24 made of Bakelite or the like and a pressure sensor 25. The threaded shaft 23a is connected to the rotating shaft of the servo motor 22 via the reduction gear. Rotating the servo motor 22 causes the threaded shaft 23a to rotate, as a result of which the nut 23b and then the pressurizing block 21 move up and down relative to the threaded shaft 23a.

The pressure sensor 25 is, for example, a one-axis load cell which measures the pressure in the vertical direction. Alternatively, a multi-axis pressure sensor may be used as the pressure sensor 25. The pressure sensor 25 can indirectly detect the pressure applied to the bonding surface between the members M1 and M2 to be bonded.

The rotative driving force of the servo motor 22 is converted into a vertical driving force by the ball screw mechanism 23, to move the pressurizing block 21 up and down.

After the driving of the servo motor 22 is stopped, the position of the pressurizing block 21 is maintained. During this, the pressurizing unit 20 applies pressure to the bonding surface while restricting the displacement of the member M2 to be bonded, thus functioning as a pressurizing unit in the present invention.

The temperature sensor 30 detects the temperature of the member M1 to be bonded, and preferably the temperature of the member M1 to be bonded near the bonding surface. The temperature sensor 30 in this embodiment is a noncontact temperature sensor such as an infrared thermometer. Alternatively, the temperature sensor 30 may be a contact sensor, such as a thermocouple, which measures the temperature in contact with the surface of the member M1 to be bonded, or a combination of a noncontact sensor and a contact sensor.

The control unit 40 includes a CPU, a ROM, a RAM, an I/O device, and the like. An operating section 41 and a display section 42 are electrically connected to the control unit 40. The operating section 41 in this embodiment includes various operating switches such as an activation switch and a start switch, and an input panel composed of a touch panel and the like. Information input through the operating section 41 is transmitted to the control unit 40.

The control unit 40 receives detection signals from the encoder 22a, the pressure sensor 25, and the temperature sensor 30. The control unit 40 outputs control signals to the power supply 16 and the servo motor 22, based on these detection signals, information input through the operating section 41, and control information, such as set pressure Ps, lower-limit set pressure Ps1, set temperature Ts, and set holding time Hs, stored in its storage section. The control unit 40 corresponds to a control unit in the present invention.

The set temperature Ts is equal to the softening temperature of the member M2 to be bonded, or higher than the softening temperature of the member M2 to be bonded by a predetermined temperature of about 1° C. to several tens of ° C. The set temperature Ts is appropriately set beforehand, through trial experiment or the like. The set temperature Ts is lower than the melting temperature of the member M2 to be bonded, and preferably significantly lower than the melting temperature of the member M2 to be bonded.

The temperature sensor 30 directly outputs, to the power supply 16, an OFF signal for turning off the power supply 16, when the detected temperature exceeds the set temperature Ts. The temperature sensor 30 directly outputs, to the power supply 16, an ON signal for turning on the power supply 16, when the detected temperature decreases to the set temperature Ts or lower. Thus, the temperature sensor 30 directly outputs the signals to the power supply 16 not through the control unit 40, so that the temperature T of the member M1 to be bonded can be promptly restored to the set temperature Ts. In this way, the temperature T of the member M1 to be bonded is constantly maintained at the set temperature Ts.

The display section 42 is electrically connected to the control unit 40. The display section 42 in this embodiment includes a digital display panel, a lamp, and the like. The display section 42 receives, from the control unit 40, information based on an arithmetic result in the control unit 40 or an input to the control unit 40, and displays the information.

Figure 4:
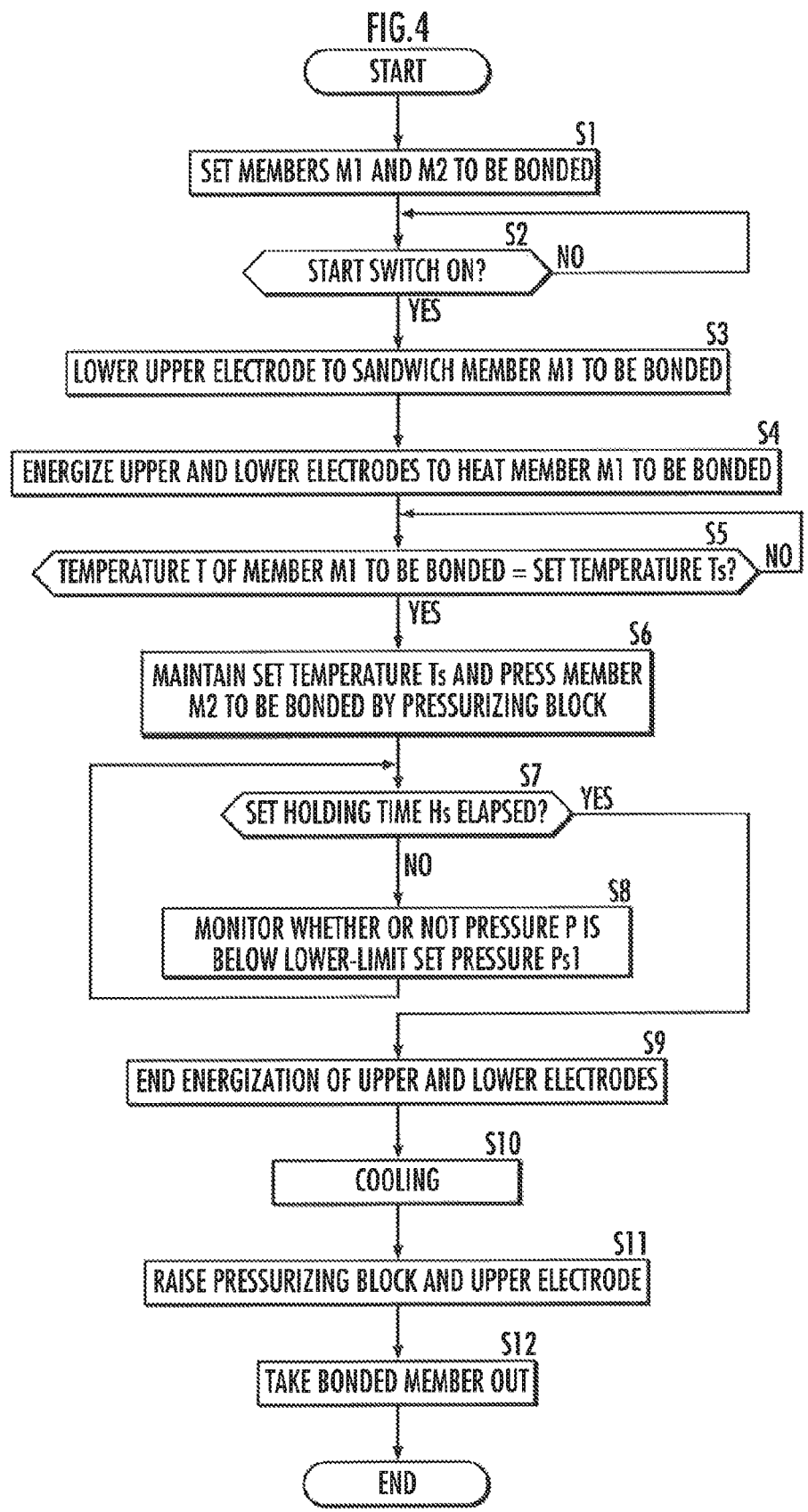
FIG. 4 is a flowchart illustrating an electrical heating bonding method according to the first embodiment of the present invention.

The following describes processes when an electrical heating bonding method according to the first embodiment of the present invention is carried out using the above-described electrical heating bonding device 1, with reference to FIG. 4. The processes of S3 to S11 described below are carried out by the control unit 40.

First, an operator sets the members M1 and M2 to be bonded, on the lower electrode 12 (S1). Here, a positioning pin and the like may be used to assist the setting of the members M1 and M2 to be bonded.

When the operator turns on the start switch in the operating section 41 (S2: YES), the servo motor 22 is driven to lower the upper electrode 11 (S3). As a result, the member M1 to be bonded is sandwiched between the upper electrode 11 and the lower electrode 12. The pressure acting on the member M1 to be bonded as a result of the member M1 to be bonded being sandwiched between the upper electrode 11 and the lower electrode 12 is just enough to ensure that the member M1 to be bonded is in contact with the upper electrode 11 and the lower electrode 12.

While the state in which the member M1 to be bonded is sandwiched between the upper electrode 11 and the lower electrode 12 is maintained, the power supply 16 is started to energize the upper electrode 11 and the lower electrode 12 (S4). The member M1 to be bonded is thus heated and increases in temperature. In this state, the member M2 to be bonded is not in contact with the member M1 to be bonded with large pressure, and a portion of the member M2 to be bonded near the contact surface with the member M1 to be bonded does not increase much in temperature and is not deformed.

After this, when the temperature T of the member M1 to be bonded, detected by the temperature sensor 30, reaches the set temperature Ts (S5: YES), the servo motor 22 is driven to lower the pressurizing block 21 while the set temperature Ts is maintained. As a result, the pressurizing block 21 presses the member M1 to be bonded against the member M2 to be bonded, with the predetermined set pressure Ps (S6).

Here, the set temperature Ts is maintained by the temperature sensor 30 directly outputting an OFF signal or an ON signal to the power supply 16. Whether or not the applied pressure is the set pressure Ps is determined by monitoring the detection value from the pressure sensor 25.

The state in which the pressurizing block 21 presses the member M2 to be bonded while the predetermined set temperature Ts is maintained is continued for the predetermined set holding time Hs (S7). Whether or not the state has been continued for the set holding time Hs is determined using a timer (not shown) in the control unit 40.

During this, the portion of the member M2 to be bonded near the steps as the contact surface with the member M1 to be bonded is heated and increases in temperature. Since a very small gap existing between the outer peripheral surface of the member M1 to be bonded and the inner peripheral surface of the member M2 to be bonded serves as a heat insulating layer of air, the inner peripheral surface of the member M2 to be bonded is hardly heated, and only the portion near the steps is heated.

During this, whether or not the pressure P detected by the pressure sensor 25 falls below the predetermined lower-limit set pressure Ps1 is monitored (S8). The lower-limit set pressure Ps1 is the pressure P in a state in which the portion of the member M2 to be bonded near the contact surface with the member M1 to be bonded has melted, and may be set with reference to the material, shape, and the like of the member M2 to be bonded. The lower-limit set pressure Ps1 is set to enable adjustment of the penetration amount of the member M2 to be bonded.

When the set holding time Hs has elapsed or when the pressure detected by the pressure sensor 25 has fallen below the lower-limit set pressure Ps1, the power supply 16 is stopped to end the energization of the upper electrode 11 and the lower electrode 12 (S9). The cooling mechanism (not shown) then circulates the cooling fluid through the lower conductive electrode 12a and the pressurizing block 21, to cool the members M1 and M2 to be bonded (S10).

The cooling mechanism ends the cooling when a predetermined cooling time has elapsed, with reference to the timer (not shown) in the control unit 40. The cooling mechanism may end the cooling when the temperature detected by the temperature sensor 30 has fallen below a predetermined temperature. The determination may be made based only on the set temperature Ts or the lower-limit set pressure Ps1.

After this, the servo motor 22 is driven to raise the pressurizing block 21 and the upper electrode 11 (S11).

As a result, the melted portion of the member M2 to be bonded near the contact surface with the member M1 to be bonded decreases in temperature and hardens, and the members M1 and M2 to be bonded are firmly bonded to each other. The portions of the member M2 to be bonded other than the portion near the contact surface with the member M1 to be bonded do not melt, and few portions increase to the softening start temperature or higher. Thus, the member M2 to be bonded hardly experiences deformation such as distortion, bending, or compression.

After this, the operator takes the bonded member out (S12).

In the case where the member M1 to be bonded is heated while the member M2 to be bonded is pressed against the member M1 to be bonded as conventionally done, the heat in the heating process flows into the member M2 to be bonded, causing an increase in temperature of the whole member M2 to be bonded. The member M2 to be bonded exceeds its quality guarantee temperature and suffers quality deterioration, and experiences deformation such as distortion, bending, or compression.

In this embodiment, the member M1 to be bonded is not pressed against the member M2 to be bonded with large pressure until the temperature T of the member M1 to be bonded reaches the set temperature Ts (S5: YES), so that few portions of the member M2 to be bonded increase to the softening start temperature or higher. Thus, the member M2 to be bonded hardly experiences deformation such as distortion, bending, or compression. Besides, few portions of the member M2 to be bonded exceed the quality guarantee temperature, and therefore the quality of the member M2 to be bonded is kept high.

In this embodiment, the temperature T of the member M1 to be bonded is maintained at the set temperature Ts with accuracy of, for example, ±1° C. Since the portion of the member M2 to be bonded near the bonding surface softens under optimum conditions, bubbles and the like are not generated. This contributes to high bonding strength.

Moreover, the members M1 and M2 to be bonded are bonded at a temperature lower than the melting temperature of the member M2 to be bonded. The members M1 and M2 to be bonded can thus be bonded in a normal air atmosphere, without an oxide film being formed on the bonding surface. The device can be simplified because the bonding portion does not need to be in a vacuum atmosphere or an inert gas atmosphere.

If the corners of the member M1 to be bonded are sharpened while the corners of the member M2 to be bonded are rounded, the corners of the member M1 to be bonded are pressed firmly against the corners of the member M2 to be bonded, ensuring that the corners are bonded together. Since the corners are bonded around the circumference, the bonded member has high airtightness.

Second Embodiment

The following describes an electrical heating bonding device 101 which is a second embodiment of the present invention.

Figure 5:
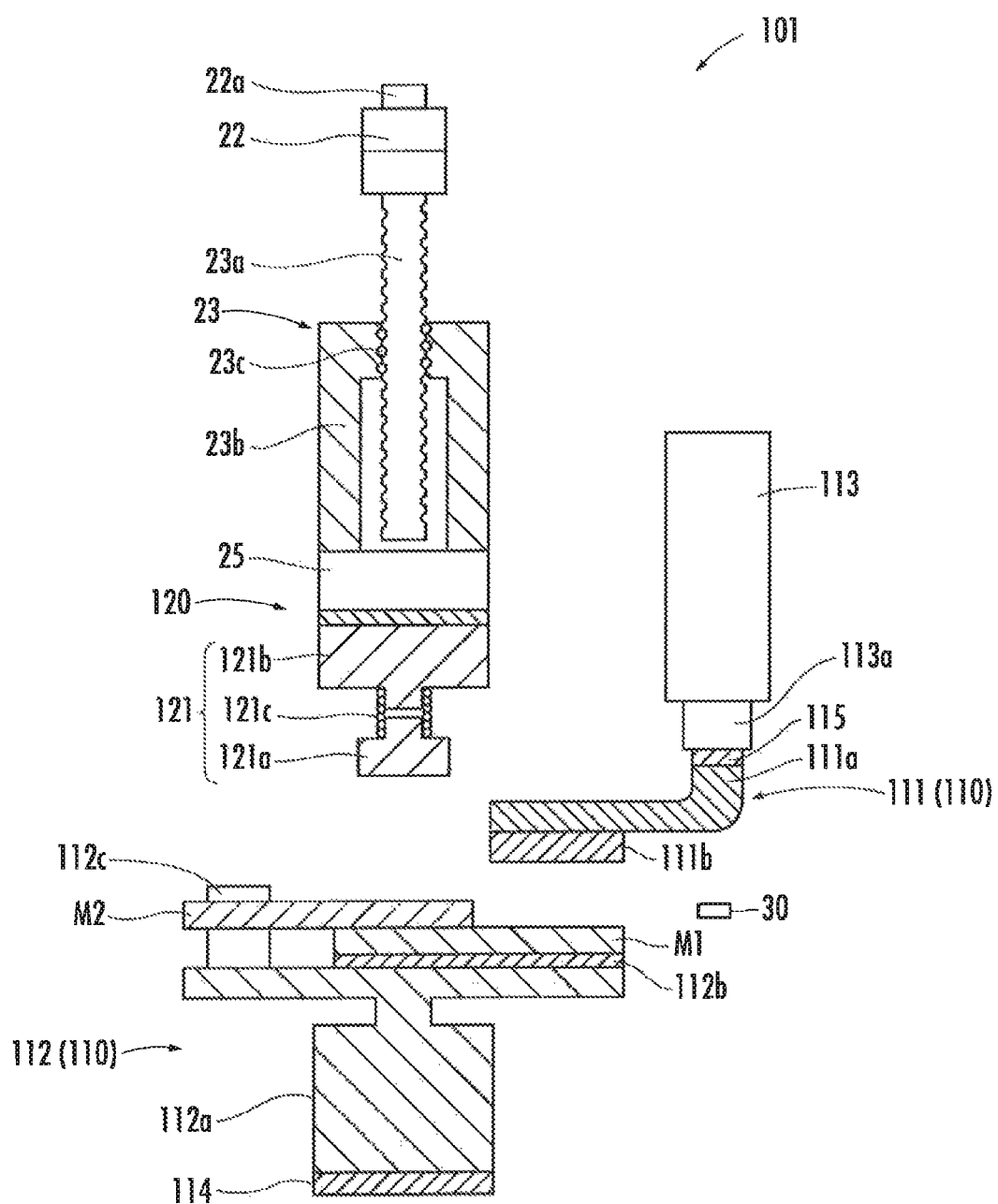
FIG. 5 is a schematic sectional view of an electrical heating bonding device according to a second embodiment of the present invention.
Figure 6:
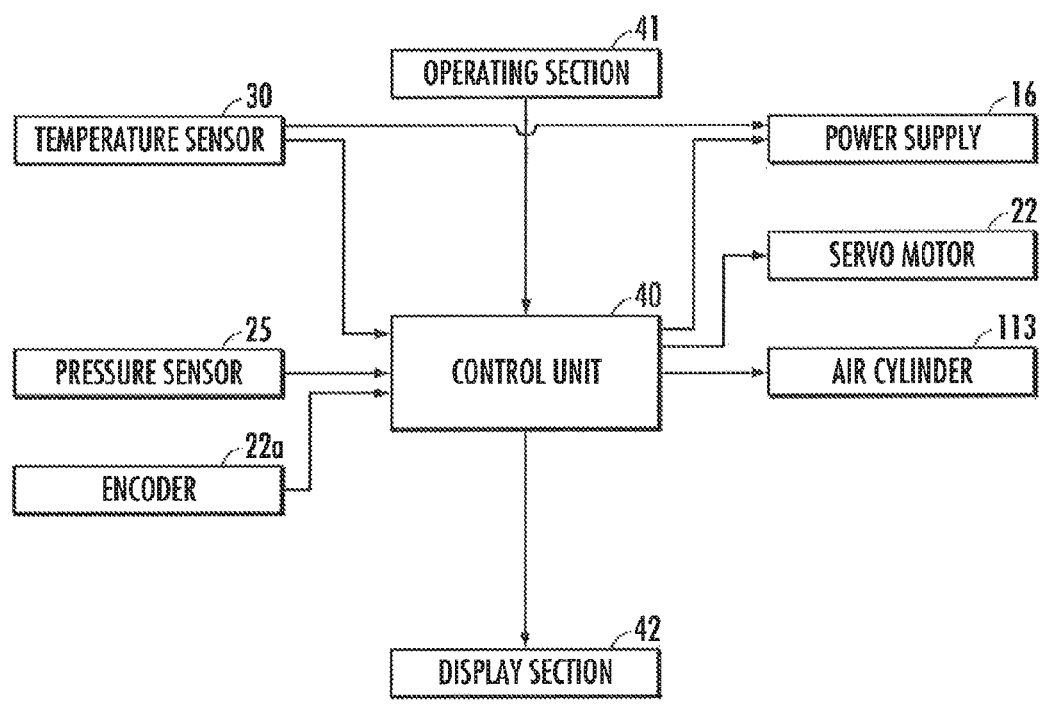
FIG. 6 is a block diagram of the electrical heating bonding device.
Figure 7:
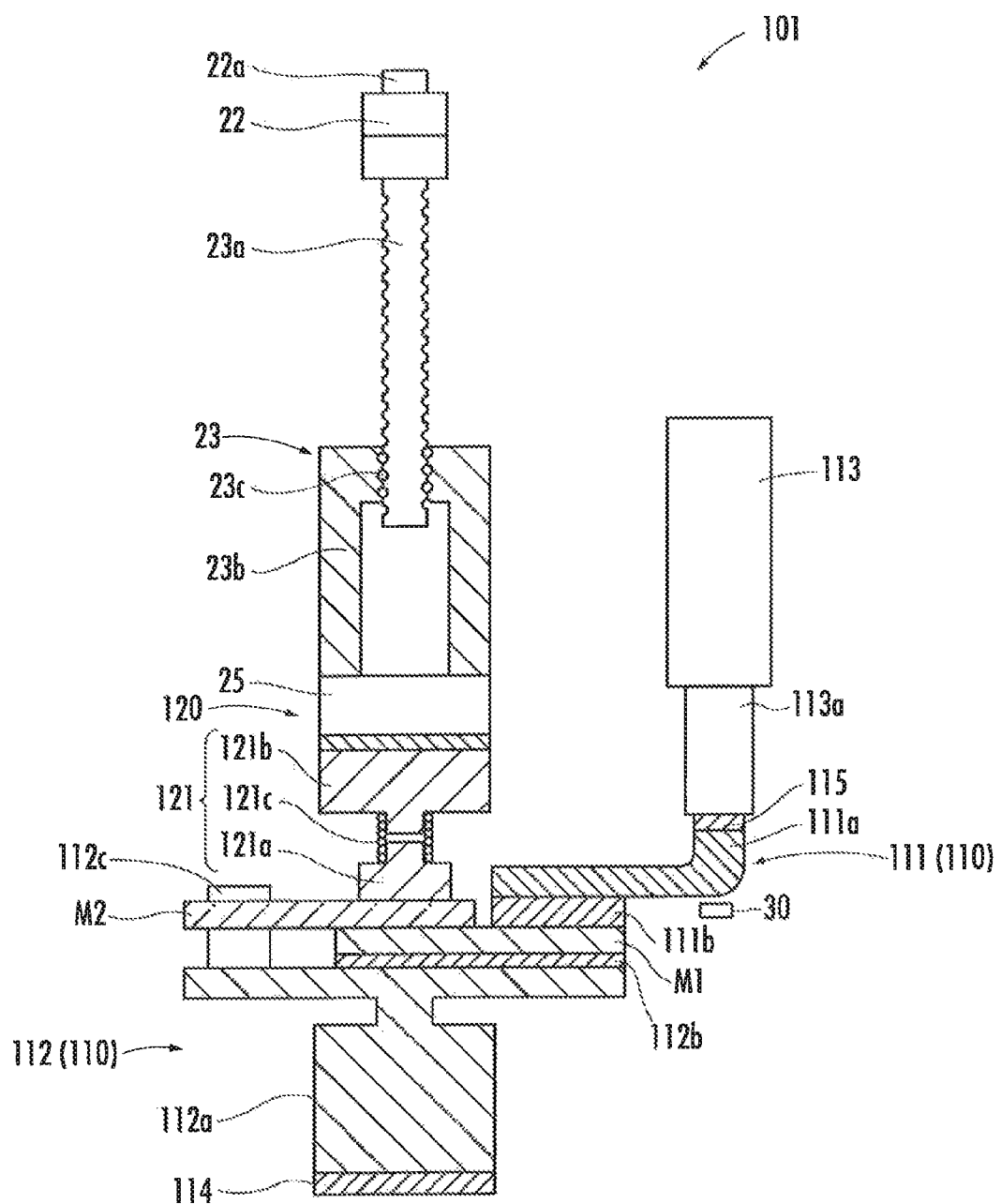
FIG. 7 is a schematic sectional view illustrating the pressing state of the electrical heating bonding device.

With reference to FIGS. 5 to 7, the electrical heating bonding device 101 is a device which bonds a rectangular plate-like member M1 to be bonded, which is made of a metal, and a rectangular plate-like member M2 to be bonded, which is made of a resin. The electrical heating bonding device 101 is similar to the electrical heating bonding device 1 described above, and so the same or corresponding members are given the same reference signs and only the differences are described below.

The electrical heating bonding device 101 includes an electrode unit 110, a pressurizing unit 120, the temperature sensor 30, and the control unit 40. These components are mounted on a chassis (not shown).

The electrode unit 110 includes: a pair of an upper electrode 111 and a lower electrode 112; and a vertical movement mechanism 113 which moves the upper electrode 111 up and down. The vertical movement mechanism 113 in this embodiment is an air cylinder.

The upper electrode 111 in this embodiment includes: an upper conductive electrode 111a made of copper, molybdenum, tungsten, or the like; and a resistive element 111b fixed to the bottom of the upper conductive electrode 111a. The upper conductive electrode 111a is fixed to the lower end of a piston 113a of the air cylinder 113 via an insulator 115 made of Bakelite or the like.

The lower electrode 112 in this embodiment includes: a lower conductive electrode 112a made of copper, molybdenum, tungsten, or the like; and a resistive element 112b fixed to the top of the lower conductive electrode 112a. The bottom of the lower conductive electrode 112a is fixed to a chassis (not shown) via an insulator 114 made of Bakelite or the like.

The resistive element 111b in the upper electrode 111 comes into contact with the upper surface of the member M1 to be bonded, but does not come into contact with the member M2 to be bonded. The resistive element 111b in this embodiment is shaped like such a rectangular plate that comes into contact with approximately half of the upper surface of the member M1 to be bonded.

The resistive element 112b in the lower electrode 112 comes into contact with the lower surface of the member M1 to be bonded, but does not come into contact with the member M2 to be bonded. The resistive element 112b in this embodiment is shaped like such a rectangular plate that comes into contact with substantially the entire lower surface of the member M1 to be bonded.

The lower conductive electrode 112a in the lower electrode 112 has the upper surface above which the member M2 to be bonded placed on the member M1 to be bonded can be stably placed. In detail, the lower conductive electrode 112a has a guide piece 112c for positioning both surfaces of the member M2 to be bonded. The lower conductive electrode 112a is kept from coming into contact with the member M2 to be bonded near the bonding surface, to prevent the melted member M2 to be bonded from adhering to the lower conductive electrode 112a.

The upper electrode 111 and the lower electrode 112 are positioned so that their central axes are not collinear, but the member M1 to be bonded is stably sandwiched between the upper electrode 111 and the lower electrode 112 as the upper and lower surfaces of the member M1 to be bonded are respectively in surface contact with the resistive elements 111b and 112b. By energizing the upper conductive electrode 111a and the lower conductive electrode 112a in the state where the member M1 to be bonded is sandwiched between the resistive elements 111b and 112b, approximately half of the member M1 to be bonded including the bonding surface can be heated uniformly.

The pressurizing unit 120 includes: a pressurizing block 121 which comes into contact with the member M2 to be bonded; the drive source 22 for driving the pressurizing block 121; and the ball screw mechanism 23 which transmits the driving force of the drive source 22 to move the pressurizing block 121 up and down.

The pressurizing block 121 is made of copper, molybdenum, tungsten, or the like, and includes: a pressurizing plate 121a which comes into surface contact with the upper surface of the member M2 to be bonded; a block body 121b integrally formed with the pressurizing plate 121a; and an elastic body 121c provided between the pressurizing plate 121a and the block body 121b. The pressurizing plate 121a comes into contact with the upper surface of the member M2 to be bonded, but does not come into contact with the member M1 to be bonded and the upper electrode 111. The pressurizing plate 121a in this embodiment is shaped like such a rectangular plate that comes into contact with a portion of the upper surface of the member M2 to be bonded above the bonding surface.

The elastic body 121c generates an elastic force in the direction in which the pressurizing plate 121a and the block body 121b are separated from each other, and is composed of a spring such as a spiral spring. Though not shown, the pressurizing plate 121a and the block body 121b are kept from separating from each other over a maximum clearance.

The rotative driving force of the servo motor 22 is converted into a vertical driving force by the ball screw mechanism 23, to move the pressurizing block 121 up and down.

After the driving of the servo motor 22 is stopped, the position of the pressurizing block 121 is maintained. During this, the pressurizing unit 120 applies pressure to the bonding surface while restricting the displacement of the member M2 to be bonded using the elastic force of the elastic body 121c, thus functioning as a pressurizing unit in the present invention.

Processes when an electrical heating bonding method according to the second embodiment of the present invention is carried out using the above-described electrical heating bonding device 101 are similar to those of the electrical heating bonding method according to the first embodiment of the present invention described earlier, and so only the differences are described below with reference to FIG. 4.

When an operator turns on the start switch in the operating section 41 (S2: YES), the air cylinder 113 is driven to lower the upper electrode 111 (S3). As a result, the member M1 to be bonded is sandwiched between the upper electrode 111 and the lower electrode 112. The pressure acting on the member M1 to be bonded as a result of the member M1 to be bonded being sandwiched between the upper electrode 111 and the lower electrode 112 is just enough to ensure that the member M1 to be bonded is in contact with the upper electrode 111 and the lower electrode 112.

While the state in which the member M1 to be bonded is sandwiched between the upper electrode 111 and the lower electrode 112 is maintained, the power supply 16 is started to energize the upper electrode 111 and the lower electrode 112 (S4). The member M1 to be bonded is thus heated and increases in temperature. In this state, the member M2 to be bonded is merely placed on the member M1 to be bonded, and a portion of the member M2 to be bonded near the contact surface with the member M1 to be bonded does not increase much in temperature and is not deformed.

After this, when the temperature T of the member M1 to be bonded, detected by the temperature sensor 30, reaches the set temperature Ts (S5: YES), the servo motor 22 is driven to lower the pressurizing block 121 while the set temperature Ts is maintained. As a result, the pressurizing plate 121a presses the member M2 to be bonded against the member M1 to be bonded, with the predetermined set pressure Ps (S6). Here, the elastic body 121c prevents sudden large pressure exceeding the set pressure Ps from acting on the member M2 to be bonded.

The state in which the pressurizing plate 121a presses the member M2 to be bonded while the predetermined set temperature Ts is maintained is continued for the predetermined set holding time Hs (S7). During this, whether or not the pressure P detected by the pressure sensor 25 falls below the predetermined lower-limit set pressure Ps1 is monitored (S8).

When the set holding time Hs has elapsed or when the pressure detected by the pressure sensor 25 has fallen below the lower-limit set pressure Ps1, the power supply 16 is stopped to end the energization of the upper electrode 111 and the lower electrode 112 (S9). The cooling mechanism (not shown) then circulates the cooling fluid through the lower conductive electrode 112a and the pressurizing block 121, to cool the members M1 and M2 to be bonded (S10).

After this, the servo motor 22 is driven to raise the pressurizing block 121, and the air cylinder 113 is driven to raise the upper electrode 111 (S11).

As a result, the melted portion of the member M2 to be bonded near the contact surface with the member M1 to be bonded decreases in temperature and hardens, and the members M1 and M2 to be bonded are firmly bonded to each other. The portions of the member M2 to be bonded other than the portion near the contact surface with the member M1 to be bonded do not soften, and few portions increase to the softening start temperature or higher. Thus, the member M2 to be bonded hardly experiences deformation such as distortion, bending, or compression.

After this, the operator takes the bonded member out (S12).

In this embodiment, the member M1 to be bonded is not pressed against the member M2 to be bonded until the temperature T of the member M1 to be bonded reaches the set temperature Ts (S5: YES), so that few portions of the member M2 to be bonded reach the softening start temperature or higher. Thus, the member M2 to be bonded hardly experiences deformation such as distortion, bending, or compression. Besides, few portions of the member M2 to be bonded exceed the quality guarantee temperature, and therefore the quality of the member M2 to be bonded is kept high.

Though the embodiments of the present invention have been described above, the present invention is not limited to such. For example, the number of electrodes for the member M1 to be bonded, the portion where the electrode is placed, and the like are not limited.

Though the above describes the case where the upper electrode 11 or 111 is moved, the present invention is not limited to such. The lower electrode 12 or 112 may be moved, or the upper electrode 11 or 111 and the lower electrode 12 or 112 may both be moved.

Though the above describes the case where the ball screw mechanism 23 causes the pressurizing block 21 or 121 to reciprocate, the mechanism which causes the pressurizing block 21 or 121 to reciprocate is not limited to such, and a known mechanism may be used. An example of the known mechanism is a rectilinear travel guide mechanism.

Though the second embodiment describes the case where the elastic body 121c is included, the pressurizing plate 121a and the block body 121b may be integrally formed without the elastic body 121c so that the driving force of the servo motor 22 is directly applied to the bonding surface as pressure.

Though the above describes the case where the members M1 and M2 to be bonded are bonded in a normal air atmosphere, the present invention is not limited to such. The portion including the bonding surface between the members M1 and M2 to be bonded may be bonded in a vacuum atmosphere or an inert gas atmosphere of nitrogen, argon, or the like.

For example, the electrical heating bonding device 1 or 101 may include an evacuation unit which evacuates the portion including at least the bonding surface between the members M1 and M2 to be bonded to create a vacuum. This prevents an oxide film from being formed on the bonding surface even when the bonding temperature approaches the melting point of the member M1 to be bonded, enabling easy and firm bonding.

For example, the evacuation unit may include: a chamber surrounding the whole electrical heating bonding device 1 or 101; an evacuation device which evacuates the chamber; and a vacuum breaker which breaks the vacuum in the chamber. The evacuation device is, for example, a vacuum pump which exhausts gas from the chamber through a supply-exhaust pipe (not shown). The vacuum breaker is, for example, a gas supply pump which supplies gas into the chamber through the supply-exhaust pipe. The vacuum breaker may be a valve or the like provided in the supply-exhaust pipe to introduce outside air into the chamber.

Preferably, a vacuum sensor of Pirani type or the like is installed to detect the degree of vacuum (pressure) in the chamber, and a door through which the members M1 and M2 to be bonded are put in or taken out is provided on the front side of the chamber. The temperature sensor 30 may be installed outside a viewing window of the chamber.

The members M1 and M2 to be bonded may each have any shape such as a pipe, a bulk, a thick plate, or a thin plate, and may have undergone any processing such as grooving or drilling. The upper electrode 11 or 111, the lower electrode 12 or 112, and the pressurizing unit 20 or 120 may be appropriately formed depending on the shapes of the members M1 and M2 to be bonded and the shape and position of their bonding portion.

Moreover, two or more members M2 to be bonded may be simultaneously bonded to the member M1 to be bonded.

EXAMPLES

The following describes examples of the present invention.

The members M1 and M2 to be bonded were bonded using the electrical heating bonding device 101 described above. The material of the member M1 to be bonded was aluminum (A1050), tough pitch copper (C1100), stainless steel (SUS304), or an ordinary steel plate (SPCC). The material of the member M2 to be bonded was polyphenylene sulfide (PPS) or polyamide (PA) 66.

A slender piece of 49 mm in length, 12 mm in width, and 1.5 mm in thickness was prepared as the member M1 to be bonded, and a slender piece of 49 mm in length, 12 mm in width, and 3 mm in thickness was prepared as the member M2 to be bonded. These slender pieces were arranged so as to have a bonding surface of 12 mm in length and 12 mm in width, and bonded.

The set temperature Ts, the set holding time Hs, the current I applied to the upper electrode 111 and the lower electrode 112, and the set pressure Ps were set as shown in Table 1.

As a result of a tensile shear test on the bonded member, the base material of the member M2 to be bonded broke in all examples. This demonstrates high bonding strength.

TABLE 1

|  | Example 1 | Example 2 | Example 3 | Example 4 | Example 5 | Example 6 |
|---|---|---|---|---|---|---|
| Member M1 to be bonded (metal) | A1050 | A1050 | C1100 | SUS304 | SPCC | SPCC |
| Member M2 to be bonded (resin) | PPS | PA66 | PPS | PPS | PPS | PA66 |
| Set temperature Ts (° C.) | 230 | 160 | 230 | 230 | 230 | 160 |
| Set holding time Hs (sec) | 4.0 | 5.0 | 5.0 | 4.0 | 4.0 | 5.0 |
| Applied current I (KA) | 1.6 | 1.6 | 1.6 | 1.6 | 1.6 | 1.6 |
| Set pressure Ps (N) | 20 | 20 | 20 | 20 | 20 | 20 |
| Tensile shear test | Not measurable (resin base material broke) | | | | | |

REFERENCE SIGNS LIST 1, 101: electrical heating bonding device
10, 110: electrode unit
11, 111: upper electrode (electrode)
11a, 111a: upper conductive electrode
11b, 111b: resistive element
12, 112: lower electrode (electrode)
12a, 112a: lower conductive electrode
12b, 112b: resistive element
13: push-up mechanism
13a: spring
14, 114, 115: insulator
16: power supply
20, 120: pressurizing unit (pressurizing unit)
21, 121: pressurizing block
22: drive source, servo motor
22a: encoder
23: ball screw mechanism
24: insulator
25: pressure sensor
30: temperature sensor
40: control unit (control unit)
113: air cylinder (vertical movement mechanism)
121a: pressurizing plate
121b: block body
121c: elastic body
M1: member to be bonded (first member to be bonded)
M2: member to be bonded (second member to be bonded)

The invention claimed is:

1. An electrical heating bonding device, comprising:
a plurality of electrodes configured to sandwich a first member to be bonded, and to be electrically conductive with the first member to be bonded, the first member to be bonded being made of metal;
a pressurizing unit configured to apply pressure to a bonding surface between the first member to be bonded and a second member to be bonded, the second member to be bonded being made of resin;
a temperature sensor which detects a temperature of the first member to be bonded; and
a control unit which controls the pressurizing unit to start applying the pressure to the bonding surface after the temperature detected by the temperature sensor reaches a predetermined temperature, and to continuously apply the pressure to the bonding surface while the predetermined temperature is maintained, the predetermined temperature being greater than or equal to a softening temperature of the second member to be bonded, and less than a melting temperature of the second member to be bonded.

2. The electrical heating bonding device according to claim 1, comprising,
a pressure sensor which detects the pressure applied to the bonding surface,
wherein the control unit controls the pressurizing unit to stop applying the pressure to the bonding surface, in a case where the pressure detected by the pressure sensor exceeds a predetermined pressure.

3. The electrical heating bonding device according to claim 2, wherein the control unit is in communication with the pressure sensor and includes a central processing unit and a memory which are configured to cause the control unit to control the pressurizing unit to start applying the pressure to the bonding surface after the temperature detected by the temperature sensor reaches the predetermined temperature, to continuously apply the pressure to the bonding surface while the predetermined temperature is maintained, and to stop applying the pressure to the bonding surface, in a case where the pressure detected by the pressure sensor exceeds a predetermined pressure.

4. The electrical heating bonding device according to claim 3, comprising
a power supply which supplies a current to the electrodes,
wherein the power supply is in operation in a case where the temperature detected by the temperature sensor is lower than or equal to the predetermined temperature, and is stopped in a case where the temperature detected by the temperature sensor exceeds the predetermined temperature.

5. The electrical heating bonding device according to claim 3, wherein, the control unit is further caused to control, after controlling the pressurizing unit to apply the pressure to the bonding surface, the pressurizing unit to stop applying the pressure to the bonding surface in a case where a predetermined time has elapsed.

6. The electrical heating bonding device according to claim 2, wherein, after controlling the pressurizing unit to apply the pressure to the bonding surface, the control unit controls the pressurizing unit to stop applying the pressure to the bonding surface in a case where a predetermined time has elapsed.

7. The electrical heating bonding device according to claim 2, wherein the pressurizing unit includes an elastic body, and applies the pressure to the bonding surface using an elastic force of the elastic body.

8. The electrical heating bonding device according to claim 1, comprising
a power supply which supplies a current to the electrodes,
wherein the power supply is in operation in a case where the temperature detected by the temperature sensor is lower than or equal to the predetermined temperature, and is stopped in a case where the temperature detected by the temperature sensor exceeds the predetermined temperature.

9. The electrical heating bonding device according to claim 8, comprising,
a pressure sensor which detects the pressure applied to the bonding surface,
wherein the control unit controls the pressurizing unit to stop applying the pressure to the bonding surface, in a case where the pressure detected by the pressure sensor exceeds a predetermined pressure.

10. The electrical heating bonding device according to claim 8, wherein, after controlling the pressurizing unit to apply the pressure to the bonding surface, the control unit controls the pressurizing unit to stop applying the pressure to the bonding surface in a case where a predetermined time has elapsed.

11. The electrical heating bonding device according to claim 8, wherein the pressurizing unit includes an elastic body, and applies the pressure to the bonding surface using an elastic force of the elastic body.

12. The electrical heating bonding device according to claim 1, wherein the control unit includes a central processing unit and a memory which are configured to cause the control unit to control the pressurizing unit to start applying the pressure to the bonding surface after the temperature detected by the temperature sensor reaches the predetermined temperature, and to continuously apply the pressure to the bonding surface while the predetermined temperature is maintained.

13. The electrical heating bonding device according to claim 12, wherein, the control unit is further caused to control, after controlling the pressurizing unit to apply the pressure to the bonding surface, the pressurizing unit to stop applying the pressure to the bonding surface in a case where a predetermined time has elapsed.

14. The electrical heating bonding device according to claim 1, wherein, after controlling the pressurizing unit to apply the pressure to the bonding surface, the control unit controls the pressurizing unit to stop applying the pressure to the bonding surface in a case where a predetermined time has elapsed.

15. The electrical heating bonding device according to claim 1, wherein the first member to be bonded and the second member to be bonded are bonded in an air atmosphere.

16. The electrical heating bonding device according to claim 1, wherein the pressurizing unit includes an elastic body, and applies the pressure to the bonding surface using an elastic force of the elastic body.

17. An electrical heating bonding method, comprising:
sandwiching a first member to be bonded between a plurality of electrodes which are electrically conductive with the first member to be bonded, and energizing the plurality of electrodes, the first member to be bonded being made of metal;
detecting a temperature of the first member to be bonded and after the temperature reaches a predetermined temperature starting to apply pressure to a bonding surface between the first member to be bonded and a second member to be bonded, the second member to be bonded being made of resin; and
continuously applying pressure to the bonding surface between the first member to be bonded and the second member to be bonded while maintaining the predetermined temperature,
wherein the predetermined temperature is greater than or equal to a softening temperature of the second member to be bonded, and less than a melting temperature of the second member to be bonded.

* * * * *